(12) United States Patent
Martin et al.

(10) Patent No.: US 7,213,290 B2
(45) Date of Patent: *May 8, 2007

(54) HYDRAULICALLY DYNAMIC MONO-PIG SCRAPER

(75) Inventors: Herbert Martin, Weinstadt (DE); Werner Schwager, Ludwigsburg (DE); Martin Stiegler, Steinheim (DE); Andreas Collmer, Vaibingen (DE); Manfred Michelfelder, Steinheim (DE)

(73) Assignee: Durr Systems, Inc., Plymouth, MI (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/434,411

(22) Filed: May 15, 2006

(65) Prior Publication Data
US 2006/0200923 A1    Sep. 14, 2006

Related U.S. Application Data

(63) Continuation of application No. 11/151,666, filed on Jun. 13, 2005, now abandoned, which is a continuation of application No. 10/760,954, filed on Jan. 20, 2004, now abandoned.

(30) Foreign Application Priority Data
Jan. 20, 2003 (DE) .................. 103 01 942

(51) Int. Cl.
*B08B 9/055* (2006.01)
(52) U.S. Cl. .............. 15/104.061; 15/3.5; 118/105; 118/214
(58) Field of Classification Search ........... 15/104.061, 15/104.063, 3.5, 3.51, 3.52; 118/622, 214, 118/105, 679; 239/703; 264/270, 269, 36.16; 73/49.1
See application file for complete search history.

*Primary Examiner*—Gladys J P Corcoran
*Assistant Examiner*—Shay L. Karls
(74) *Attorney, Agent, or Firm*—Howard & Howard Attorneys, P.C.

(57) ABSTRACT

The invention concerns a pig scraper for cleaning the inside wall of a coating agent conduit. The pig scraper includes a body insertable in the conduit and at least one sealing lip that seals against the inside wall of the conduit and extends parallel to a longitudinal axis of the body. A space is defined between the sealing lip and the body to form a pocket for enhancing the sealing of the sealing lip with respect to the conduit. The length of the sealing lip substantially prevents the lip from folding over on itself in response to a change in the direction of movement of the pig scraper in the conduit.

13 Claims, 1 Drawing Sheet

HYDRAULICALLY DYNAMIC MONO-PIG SCRAPER

RELATED APPLICATIONS

This application is a continuation application of Ser. No. 11/151,666 filed Jun. 13, 2005 now abandoned which is a continuation application of Ser. No. 10/760,954 filed Jan. 20, 2004.

FIELD OF THE INVENTION

The invention relates to a pig scraper for cleaning a coating agent conduit of a coating unit.

BACKGROUND OF THE INVENTION

In modern coating units for the series coating of construction parts, pig scrapers are used in order to remove coating agent from coating agent conduits. Coating agent residues, which stick to the inside wall of coating agent conduits, must be removed after coating operations. For example, the coating unit can be a paint unit for an automotive assembly line. A first set of automotive parts can be painted a first color by the coating unit. A second set of automotive parts can be painted a second color by the coating unit after the pig scraper has removed the first paint residue from the coating agent conduits of the coating unit.

A pig scraper is disclosed in EP 0405075B1, which consists of a basic body which can be inserted into a coating agent conduit. The basic body includes a sealing lip which essentially extends radially from the basic body and is located on a jacket surface of the basic body. During operation, the sealing lip fits tightly against the inside wall of the coating agent conduit to be cleaned. The pig scraper scrapes off coating residue sticking to the inside wall of the coating agent conduit and this way builds up an axial isolation path.

One disadvantage of pig scrapers currently known in the art is that the sealing lip can fold over in the axial direction of the body of the pig scraper when the direction of movement of the pig scraper is changed. When the lip of the pig scraper folds over, a portion of the lip is subjected to excessive deformation forces. As a result, the life of the pig scraper is shortened.

SUMMARY OF INVENTION

The present invention provides a pig scraper for cleaning a coating agent conduit. The pig scraper includes a body that is insertable in the coating agent conduit. At least one sealing lip extends from the body that is substantially parallel to a longitudinal axis of the body. The sealing lip seals against the coating agent conduit. The body and the sealing lip are integrally formed with respect to one another. For example, the pig scraper can be cast or molded from a water lacquer resistant material or a solvent resistant material. The pig scraper can also include a signal transmitter positioned in situ with respect to the body. The signal transmitter can be a permanent magnet or steel.

One of the advantages of the present invention is that the sealing lip is substantially prevented from folding over on itself. The sealing lip can be formed with several features that reduce the likelihood that the lip will fold over on itself. For example, the lip can extend a first distance parallel to the body and a second distance radially from the body, wherein the radial distance is ten percent of the axial distance. In addition, the first distance can be six percent of the length of the body.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
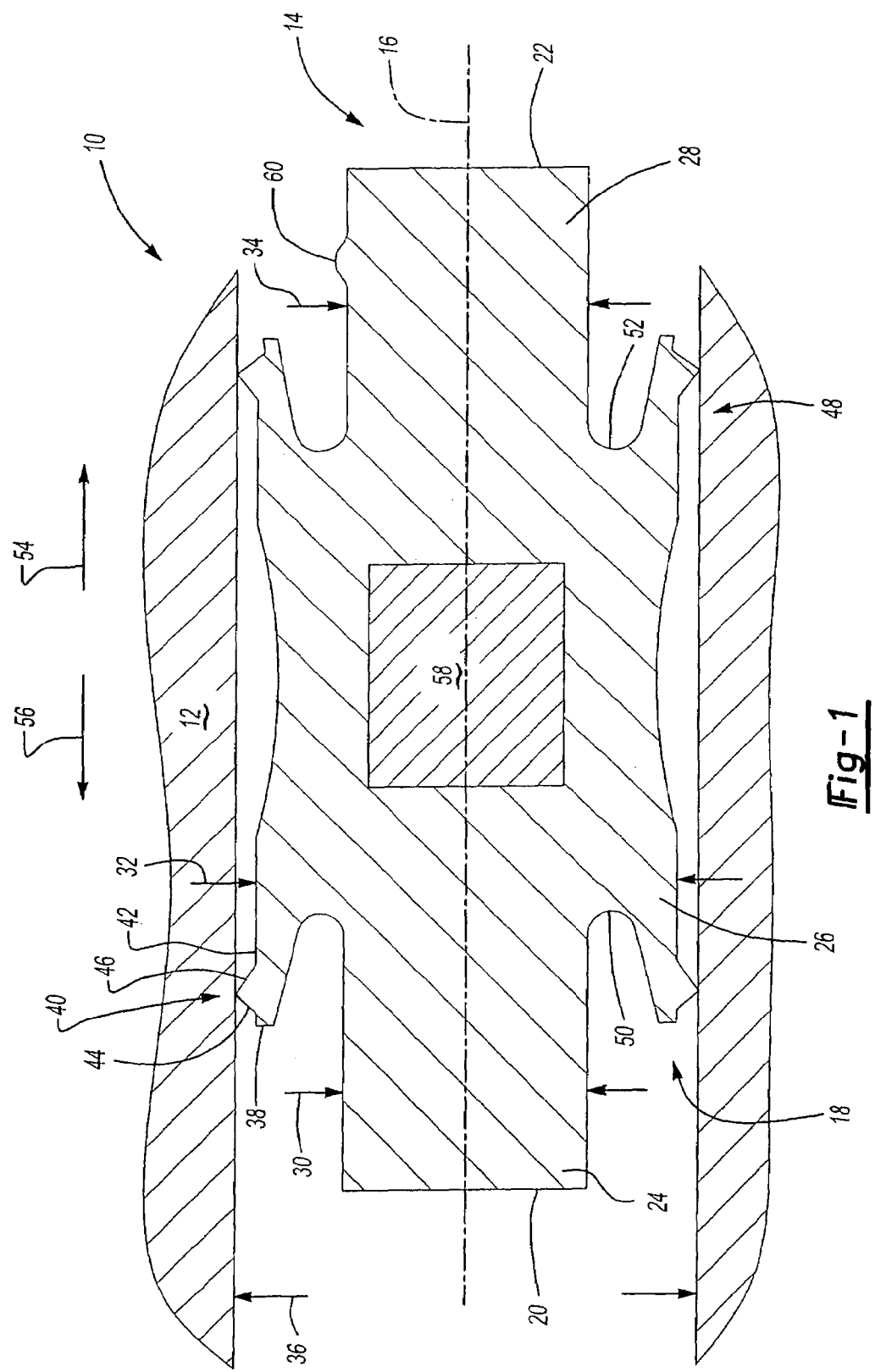
FIG. 1 is a cross-sectional view of a pig scraper according to the exemplary embodiment of the invention.

Referring now to FIG. 1, the invention provides a pig scraper 10 for cleaning a coating agent conduit 12 of a coating unit. The pig scraper 10 includes a body 14 having a length and a longitudinal axis 16. The pig scraper 10 also includes at least one sealing lip 18 extending from the body 14 and substantially parallel to the longitudinal axis 16 of the body 14.

The body 14 extends between first and second ends 20, 22. As shown by the exemplary embodiment of the invention, the body 14 defines three coaxial cylindrical portions 24, 26, 28 having diameters 30, 32, 34, respectively. One of the diameters 30, 32, 34 is preferably 80% of an inside diameter 36 of the conduit 12. More preferably, the minimum of the diameters 30, 32, 34 of the body 14 is 80% of the diameter 36. The body 14 is formed from an elastomer that is preferably water resistant and/or solvent resistant. The body 14 can be molded or cast.

Preferably, the body 14 and the lip 18 are integrally formed with respect to one another. In the exemplary embodiment of the invention, the lip 18 extends from the portion 26 to a tip 38. Preferably, a free length of the lip 18 extending from the portion 26 to the tip 38 is at least 15% of the diameter 36 of the conduit 12. Alternatively, or additionally, the free length of the lip 18 is six percent of the length of the body 14. The end 20 of the body is axially further from the portion 26 than the tip to act as a stop buffer. The stop buffer defined by the end 20 reduces the likelihood of damage to the sealing lip 18 in the event the scraper 10 encounters a second scraper in the conduit 12 or a stop.

In the exemplary embodiment of the invention, a sealing edge 40 extends from the sealing lip 18 radially outwardly with respect to the axis 16. Preferably, the height of the edge 40, as measured from an outer surface 42 of the lip 18, is at most ten percent of the free length of the lip 18. The height of the edge 40 depends on the rigidity of the material used for the sealing lip, the material strength, and the friction between the edge 40 and the inside wall of the conduit 12. For example, the height is relatively greater when the rigidity of the material is relatively greater.

The sealing edge 40 encircles the lip 18 and seals against the inner wall of the conduit 12. In the exemplary embodiment of the invention, the sealing edge 40 includes a first surface 44 facing the first end 20 of the body 14. Preferably, the surface 44 defines an angle with the inner wall of the conduit 12 of between twenty-five degrees and sixty-five degrees. More preferably, the angle between the surface 44 and the inner wall of the conduit 12 is forty-five degrees. The sealing edge 40 also includes a second surface 46. Preferably, the second surface 46 defines an angle with the inner wall of the conduit 12 of between ten degrees and sixty degrees. More preferably, the angle defined between the second surface 46 and the inner wall of the conduit 12 is thirty degrees.

In the exemplary embodiment of the invention, the pig scraper 10 includes a second sealing lip 48 structured similarly with respect to the first sealing lip 18. The lips 18, 48 cooperate with the portions 24, 28 respectively, to define first and second pockets 50, 52. The relative structure of the lips 18, 48 with respect to the body 14 can reduce the likelihood that the sealing lips 18, 48 will fold over during movement of the pig scraper 10 through the conduit 12. For example, during movement of the pig scraper 10 in the direction 54, the lip 18 is pressed against the inside wall of the conduit 12 by pressure of the motive medium, such as compressed air, acting on the pocket 50. Also, the sealing lip 48 is pressed against the inside wall of the conduit 12 during movement in the direction 54 by friction acting between the lip 48 and the inside wall of the conduit 12. Similarly, when the pig scraper 10 moves in the direction 56, the sealing lip 48 is pressed against the inside wall of the conduit 12 by the motive medium and the sealing lip 18 is pressed against the inside wall of the conduit 12 by frictional forces.

In a preferred embodiment of the invention, a signal transmitter 58 is located in the body 14. The signal transmitter 58 is a permanent magnet, a steel core, or another permanent-magnetic material. During operation of the pig scraper 10, the position of the pig scraper 10 can be monitored by monitoring the position of the signal transmitter 58. Preferably, the body 14 is formed around the signal transmitter 58. In other words, the signal transmitter 58 is positioned in situ with the body 14.

In a preferred embodiment of the invention, the body 14 defines a visible and palpable marking 60, in the form of an elevation, to indicate the spatial orientation of the signal transmitter 58 within the body 14. In this way, the pig scraper 10 can be inserted into the conduit 12 in a desired orientation.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A pig for bidirectional movement through a piggable line of a coating delivery system for cleaning an internal surface of the piggable line, comprising:

said pig integrally formed from a resilient material, and including a central body portion symmetrical around a longitudinal axis, flexible sealing lips integral with and extending longitudinally and radially from opposed ends of said central body portion extending in opposite longitudinal directions each including an outer surface having a radially extending scraping edge biased against an internal surface of the piggable line for cleaning the internal surface, and end portions integral with and extending longitudinally from said opposed ends of said central body portion beyond free ends of said flexible sealing lips coaxially aligned with said central body portion having an outer diameter less than an outer diameter of said central body portion and an inner diameter of said flexible sealing lips, spaced radially from said flexible sealing lips, and said end portion each having a flat end face spaced longitudinally from said flexible sealing lips for engaging another pig without longitudinal or radial displacement.

2. The pig as defined in claim 1, wherein said flexible sealing lips extend radially from said opposed ends of said central body portion a distance ten percent or less than a distance said flexible sealing lips extend longitudinally.

3. The pig as defined in claim 1, wherein said flexible sealing lips each include an outer surface having two angularly relatively inclined surfaces meeting at a sharp apex defining a triangular sealing edge spaced from said free end of said sealing lips, said sealing lips bending from a rest position, in which said sealing lips are set outside of the piggable line, then radially inwardly into an operating position within said piggable line, wherein said sharp apex of said triangular sealing edge is resiliently biased against the internal surface of the piggable line and said angularly relatively inclined planar surfaces extend at an acute angle to the internal surface spaced from the internal surface of said piggable line, automatically sharpening said sharp apex of said triangular sealing edge as said pig traverses back and forth through the piggable line.

4. The pig as defined in claim 3, wherein said outer surface of said flexible sealing lips each further include a planar surface extending from adjacent said central body portion to said triangular sealing edge extending parallel to said longitudinal axis.

5. The pig as defined in claim 1, wherein said end portions of said pig are cylindrical and have a greater longitudinal length than said flexible sealing lips.

6. The pig as defined in claim 1, wherein said central body portion includes a signal transmitter therein and one of said end portions includes a visual marking indicating a spatial orientation of said signal transmitter within said central body portion.

7. The pig as defined in claim 1, wherein said central body portion has a concave outer surface.

8. A pig for bidirectional movement through a piggable line of a coating delivery system for cleaning an internal surface of said piggable line, comprising:

said pig integrally formed from a resilient material, and including a central body portion symmetrical around a longitudinal axis having opposed ends, flexible annular sealing lips integral with and extending longitudinally and radially from said opposed ends of said central body portion extending from said central body portion in opposite longitudinal directions, and end portions integral with and extending longitudinally from said opposed ends of said central body portion coaxially aligned with said central body portion having an outer diameter less than an outer diameter of said central body portion and an inside diameter of said flexible annular sealing lips, said end portions each having a longitudinal length greater than said flexible annular sealing lips, said flexible annular sealing lips resiliently bendable from a rest position in which a free end of each of said flexible sealing lips is set outside of the piggable line, then radially inwardly into an operating position within the flexible pigging line, wherein an outer surface of said flexible annular sealing lips is resiliently biased against the inner surface of said piggable line, said outer surface of said flexible annular lips in said operating position each including a first planar surface adjacent said central body portion extending parallel to said longitudinal axis, a first inclined surface extending at an acute angle to said inner surface of said piggable line, a second inclined surface inclined to said first inclined surface and inclined at an acute angle relative to said inner surface of said piggable line, said first and second inclined surfaces meeting at a sharp sealing apex resiliently biased against the inner surface of said piggable line spaced from a free end of said flexible annular sealing lips, wherein said first and second inclined surfaces are relatively inclined longitudinally away from each other in opposite directions, said sharp sealing apex automatically sharpening as said pig traverses back and forth through the piggable line.

9. The pig as defined in claim 8, wherein said end portions are cylindrical, each having a flat end face spaced longitudinally outwardly from said flexible annular sealing lips for engaging another pig without longitudinal or radial displacement.

10. The pig as defined in claim 8, wherein said flexible annular sealing lips extend radially from said opposed ends of said central body portion a distance often percent or less than a distance said flexible sealing lips extend longitudinally.

11. The pig as defined in claim 8, wherein said central body portion includes a signal transmitter therein and one of said end portions includes a visual marking indicating a spatial orientation of said signal transmitter within said central body portion.

12. The pig as defined in claim 8, wherein said first inclined surface defines an acute angle relative to said inside surface of said pigging line of greater than ten degrees.

13. The pig as defined in claim 8, wherein said second inclined surface defines an acute angle relative to said inside surface of said pigging line of greater than twenty-five degrees.

* * * * *